H. LUTTERBACH.
STEERING DEVICE FOR TRACTORS.
APPLICATION FILED DEC. 21, 1920.
1,394,203.
Patented Oct. 18, 1921.
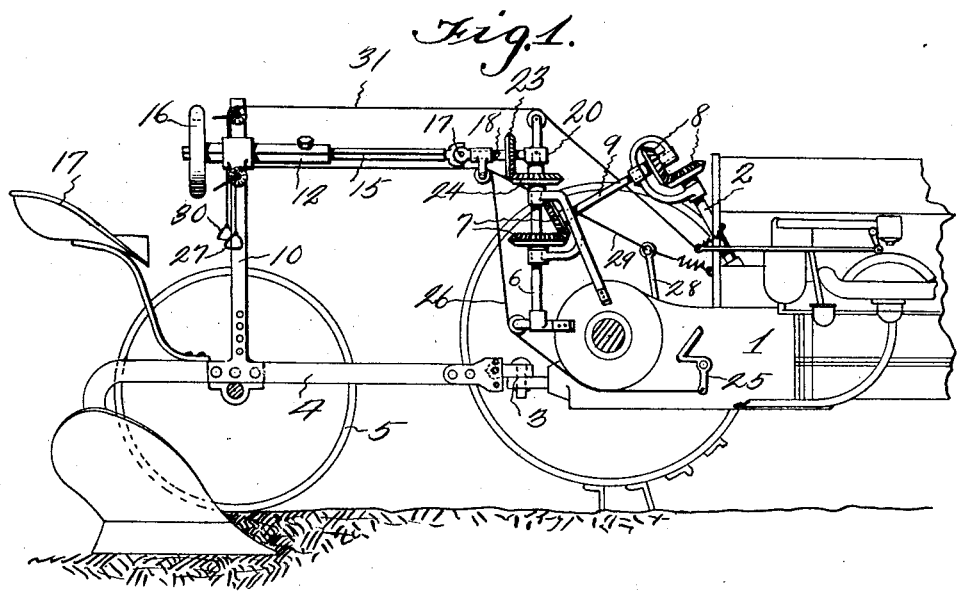
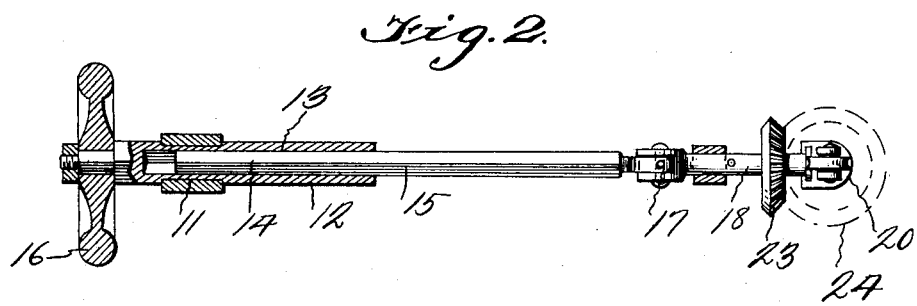
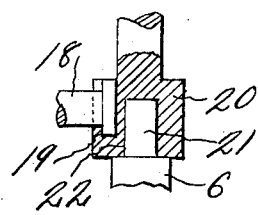
Inventor
Henry Lutterbach
By D. Swift
Attorneys

UNITED STATES PATENT OFFICE.

HENRY LUTTERBACH, OF ARMSTRONG, INDIANA.

STEERING DEVICE FOR TRACTORS.

1,394,203.  Specification of Letters Patent.  Patented Oct. 18, 1921.

Application filed December 21, 1920. Serial No. 432,233.

*To all whom it may concern:*

Be it known that I, HENRY LUTTERBACH, a citizen of the United States, residing at Armstrong, in the county of Vanderburg, State of Indiana, have invented a new and useful Steering Device for Tractors; and I do hereby declare the following to be a full, clear, and exact description of the invention, such as will enable others skilled in the art to which it appertains to make and use the same.

The invention relates to steering devices for tractors, and has for its object to provide a device of this character carried by a trailed agricultural implement and so constructed that the operator located on the trailed implement may steer and control the tractor. Also to so construct the steering mechanism that it may be easily and quickly attached and assembled when the trailed implement is attached to the tractor.

A further object is to provide a tractor with a vertically disposed shaft having gear connections with the steering post of the tractor and to provide a rearwardly extending substantially horizontally disposed steering shaft having gear connections with the vertically disposed shaft of the tractor. Also to provide the horizontally disposed steering shaft with a universal joint and a slip joint whereby said horizontal steering shaft will not interfere with the proper trailing of the trailed implement, which implement partially supports the substantially horizontally disposed steering shaft.

A further object is to provide means whereby the various mechanisms of the tractor may be controlled from the trailed implement.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the tractor and a trailed plow showing the steering mechanism applied thereto.

Fig. 2 is an enlarged horizontal sectional view through the horizontal steering shaft.

Fig. 3 is an enlarged detail sectional view through the supporting bearing for supporting the forward end of the horizontally disposed steering shaft.

Referring to the drawings, the numeral 1 designates a conventional form of tractor and to the upward and rearwardly extending steering shaft thereof. Pivotally and detachably secured at 3 to the rear end of the tractor 1 is a plow beam 4 which is trailed behind the tractor 1 and is preferably supported on wheels 5. Heretofore where a plow or other agricultural implement is trailed by a tractor, the operator occupies the seat on the tractor and controls the tractor from that point, thereby in many cases having no control over the trailed implement. To overcome this difficulty a vertically disposed shaft 6 is rotatably mounted in bearings carried by the tractor 1 and is connected to the steering shaft 2 through the medium of the gears 7 and 8, and the shaft 9. It will be seen that as the shaft 6 rotates in one direction or the other that the steering shaft 2 will also rotate and operate any conventional form of steering mechanism for controlling the wheels of the tractor. Extending upwardly from the beam 4 is a bracket 10, in a bearing 11 of which is rotatably mounted, a shaft 12, which shaft is substantially horizontally disposed and is provided with a rectangular shaped elongated aperture 13, in which aperture is slidably mounted the end 14 of a rectangular shaped bar 15, thereby providing an extensible joint to accommodate the device to different kinds of implements and also allow play incident to pivotal action of the trailed implement. The rear end of the shaft 12 is provided with a steering wheel 16 which is adapted to be grasped by the operator occupying the seat 17 on the trailed implement. The forward end of the bar 15 is universally connected as at 17 to a stub shaft 18, said stub shaft having its forward end rotatably mounted in a bearing 19 of the bracket 20. The bracket 20 forms the supporting means for the forward end of the stub shaft 18 and is in turn supported by the upper reduced portion 21 of the vertical shaft 6, which reduced portion is rotatably mounted in a bearing 22 of the bracket 20. Thus it will be seen that as the stub shaft 18 is rotated that the bracket 20 will not rotate and that the shaft 6 will rotate therein and also the stub shaft 18. Secured to the stub 18 is a beveled gear 23 which meshes with a bevel gear 24 carried by the vertical shaft 6, therefore as the stub shaft 18 is rotated the vertical shaft 6 is also rotated and the steering column 2 is in turn rotated through the meshing gears 7 and 8 and the shaft 9. Thus it will be seen that the operator on the trailed vehicle may control the steering of the tractor from his position on the trailed vehicle, thereby allowing him to observe the work of the trailed vehicle without having to turn around from the usual position of the operator on the tractor. It will also be seen that various implements may be supplied with the bracket 10 and shaft 12, and that said implement may be quickly attached to the tractor in such a manner that the steering of the tractor may be controlled from the trailed vehicle.

To control the clutch lever 25 from the operator's seat 17, a cable 26 is provided which terminates in a handle member 27 adjacent the seat 17. The transmission lever 28 is controlled through a cable 29 which terminates in a handle member 30 adjacent the operator's seat 17. The carbureter feed is controlled in the same manner through the medium of the cable 31, which terminates adjacent the operator's seat and steering wheel 16. By providing cables, it will be seen that they will not interfere with the swinging of the trailed implement from side to side when making a turn.

From the above it will be seen that a steering and controlling mechanism for tractors is provided, whereby the tractor may be entirely controlled from a trailed implement. Also that the connections are so constructed that the trailed implement may be quickly detached and another implement attached.

The invention having been set forth what is claimed as new and useful is:—

The combination with a pair of alined vehicles, the forward vehicle being provided with a steering post, of steering mechanism whereby the forward vehicle may be steered from the rear vehicle, said mechanism comprising a vertically disposed shaft carried by the forward vehicle, shafting and gear connections between said vertical shaft and the steering post, a horizontally disposed steering shaft carried by the rear vehicle and having its rear end supported in a bearing carried thereby, said horizontally disposed shaft being provided with a slip connection, the forward end of the horizontally disposed shaft being universally connected to a stub shaft rotatably mounted in a bearing supported on the upper end of a vertical shaft and gear connections between the stub shaft and the upper end of the vertical shaft.

In testimony whereof I have signed my name to this specification in the presence of two subscribing witnesses.

HENRY LUTTERBACH.

Witnesses:
 HENRY F. DEIG,
 JOS. W. SCHNEIDER.